United States Patent [19]

Shy

[11] 4,320,859

[45] Mar. 23, 1982

[54] INSULATED BUCKET WITH AIR PUMP

[76] Inventor: Min C. Shy, No. 20, Alley 18, Lane 109, Hoping St., Yang Ho City, Taipei, Taiwan

[21] Appl. No.: 156,527

[22] Filed: Jun. 4, 1980

[51] Int. Cl.³ .................. F04B 43/02; B65D 47/34; B67D 5/42; B67D 5/54
[52] U.S. Cl. ................................. 222/401; 222/536; 222/538
[58] Field of Search .............. 222/131, 400.5, 401, 222/530, 536, 538

[56] References Cited

U.S. PATENT DOCUMENTS

| | | | |
|---|---|---|---|
| 2,069,018 | 1/1937 | Rayburn | 222/538 UX |
| 2,083,776 | 6/1937 | Ferguson | 222/538 X |
| 2,275,607 | 3/1942 | Bramming | 222/401 UX |
| 2,853,210 | 9/1958 | Stewart et al. | 222/401 X |
| 2,920,795 | 1/1960 | Piker | 222/131 |
| 4,125,207 | 11/1978 | Ernst et al. | 222/530 X |
| 4,174,053 | 11/1979 | Shimizu | 222/131 X |

*Primary Examiner*—David A. Scherbel
*Attorney, Agent, or Firm*—Karl W. Flocks

[57] ABSTRACT

The present invention relates to an air compressed thermal bucket and, more particularly, to an air compressed thermal bucket, in which the drain pipe may be laid on the bucket body at users' will and the outlet may be automatically locked by way of a locked mechanism to prevent boiling water within the bucket from spilling over and to prevent loss of heat.

4 Claims, 4 Drawing Figures

4,320,859

INSULATED BUCKET WITH AIR PUMP

BACKGROUND OF THE INVENTION

The present invention relates to an air compressed thermal bucket and particularly to an air compressed thermal bucket with novel and simple construction which is convenient to users in usage.

Heretofore, the general buckets for containing boiling water include the oldest type tea bucket made in metal and the most currently prevailing thermal tea bucket. Those mentioned tea buckets usually operate by means of a faucet mounted on lateral side of bucket body for draining off and locking tea water within the bucket. In order to have water stored within the bucket drained off as clearly as possible, the faucet is always to be fixed near the bottom. However, this installation makes users getting more inconvenient by virtue of the height of the faucet lower than a cup.

The object of the present invention is an improvement over the mentioned tea buckets in the respect of usage and to disclose an air compressed thermos bucket with novel and simple construction which has some effective achievements.

SUMMARY OF THE INVENTION

In accordance with the present invention, the air compressed bucket is comprised of:

a centally spaced bucket body which is made from heatkeeping material and provided at central position of its upper part with an opening having screw threads on inner wall, and a stop annular mouth is formed at the bottom side of said opening so as to allow to be engaged with a cork member;

a cork member, at the mid position of which is provided with an air hole communicable with inside of the bucket body;

an air compressed mechanism having an elastic pouch, which is fastenedly screwed on the cork member's top of the said opening of the bucket and is provided with an exhaust exit at bottom communicating with said air hole of the cork member;

a L-shaped delivery tube planted on the top of the bucket body, in which one end of the L-shaped delvery tube deepens into inside of the bucket body directly to the bottom and the other end able to be turned arbitrarily extends out of the bucket body;

a cap body provided in the inside of upper part of the bucket body and able to shift up and down, the cap head's end of which comes slightly cut of the top of the bucket body.

The other object of the present invention is to provide an air compressed thermal bucket, in which the L-shaped delivery tube comprises the lower part called the suction pipe depending down into the inside of the bucket body and the upper part called the drain pipe extending out of the top of the bucket body. The advantage of this invention is that the drain pipe can be turned in clockwise or counter-clockwise direction in users' will so as to be laid on the top of the bucket body while not being used, and the outlet at the front end of the drain pipe may engage with the cap head's end of the cap body to block the outlet, preventing boiling water within the bucket from spilling over to scald human body or preventing heat from loss to lose efficacy of heat-keeping.

DETAILED DESCRIPTION

Figure 1:
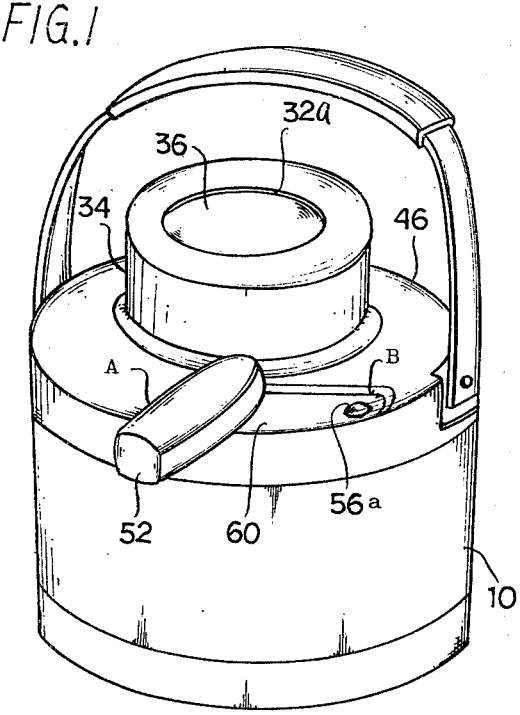
FIG. 1 is a perspective view of the air compressed thermal bucket of the invention.

Referring the drawings attached herewith, the air compressed thermos bucket of the present invention comprises a bucket body 10 having spaced double walls 12, 14 between which is filled with heat-keeping material 62 such as poly-nylon. At the central position of the upper part of the bucket body 10, there is an opening 18 with screw threads 16, and a stop annular mouth or ledge 20 is formed at the bottom side of said opening 18 so that a stopper disc cork member 22 may properly stuff into or seated on the stop annular mouth or ledge 20. And, a projected portion 26 with air hole 24 is projected upward from the mid position of the cork member 22. In addition to above construction, an air compressed mechanism 30 having an elastic pouch 28 is fastenedly screwed on the cork member's 22 top of the opening 18 of the bucket body 22.

Figure 3:
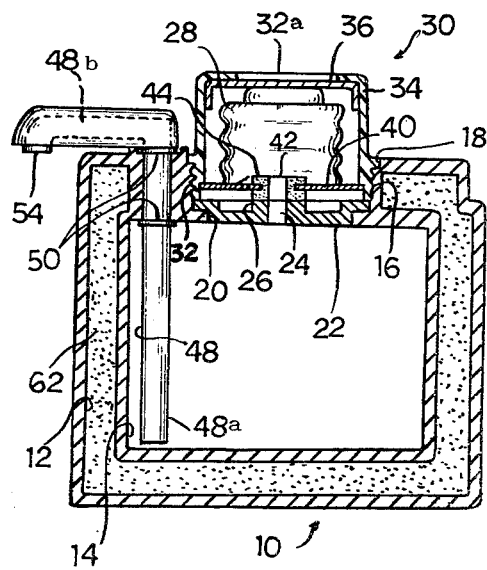
FIG. 3 is a sectional view taken along the line 3—3 of FIG. 2.

The air compressed mechanism 30 as shown in FIG. 3 is comprised of a cylindrical case 34, with circular hole 32a at top end and screw threads 32 at lower side for screwing engagement with screw threads 16 provided at the opening of the bucket body 10, an elastic pouch 28, a pressed member 36 used for pressing said elastic pouch 28, and a bottom base 40 fixed at the bottom of the elastic pouch 28. At center of said bottom base 40, a round jut 44 having exhaust exit 42 is provided, in which the round jut 44 is made from soft reisn or rubber so the exhaust exit 42 may communicate with above mentioned air hole 24 of the cork member 22 and keep air from leaking out.

Figure 2:
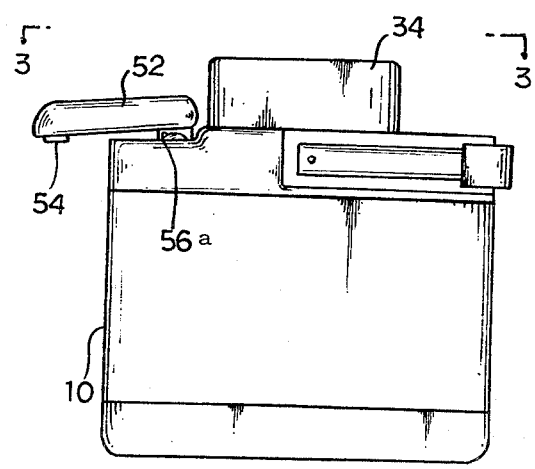
FIG. 2 is a side view of the air compressed thermal bucket of the prevent invention.

A L-shaped delivery tube 48 able to turned in users' will is planted on the top 46 of bucket body 10 near the air compressed mechanism 30, in which the delivery tube 48 is pivoted on the top 46 of the bucket body 10 by means of two fixed rings 50, comprising the lower part called the suction pipe 48 deepening into inside of the bucket body 10 and the upper part called the drain pipe 48b extending out of the bucket body 10. In figures, the indicated member 52 means the lever member 52 covering over the drain pipe 48b, which may be turned following the drain pipe 48b turning. When it is desirous to drain water off, the drain pipe 48b accompanying with the lever member 52 can be turned to the position shown in FIG. 2 and then the user may press the pressed member 36 to depress the elastic pouch 28 in shrinkage to compress air within the elastic pouch 28 into the bucket body 10 through the exhaust exit 42 and the air hole 24, so the air will add pressure on the level of boiling water within the bucket body 10 to have boiling water drained off from the outlet 54 through the suction 48a and the drain pipe 48b. However, when the thermal bucket of the invention is not being used, the drain pipe 48b and the lever member 52 may be turned to lay on the top 46 of the bucket body 10, and carefully to have the outlet 54 engaged with the cap head's 56a end of the cap body 56 to block the outlet 54, preventing boiling water within the bucket from spilling over to scald human body or keeping heat from loss to lose efficacy of heat-keeping.

Figure 4:
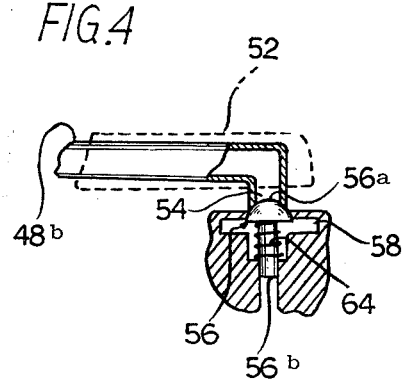
FIG. 4 is a partially sectional view of the air compressed thermos bucket while the drain pipe being laid on the top of the bucket body.

Now specifically referring FIG. 4, the above mentioned cap body 56 is planted in the sloted hole 58 of the upper part of the bucket body 10, comprising a cap head 56, which comes slightly out of the top 46 of the bucket body 10, and an axle bar 56b. The axle bar or stem 56b is provided with a compressed spring 64 for urging the cap head 56a to automatically shift up and down that will be to the advantage of the outlet 54 cross over the cap head 56a and will fortify the function of blocking outlet 54. In FIG. 1, the section, a certain area of the top 46 of the bucket body 10, where the delivery tube 48 and the cap body 56 are planted on is schemed in forming to be a concave through 60 in slight triangular shape so that the drain pipe 48b will be defined between two specified positions, A and B shown in FIG. 1, for its anchorage and turning.

I claim:
1. A heat insulated bucket including air compressing means for dispensing liquid therefrom, comprising:
   a bucket body having an opening centrally located at the upper end thereof, said opening having screw threads on the inner wall thereof and an annular ledge adjacent its lower end;
   a stopper member seated on said annular ledge, said stopper member having a hole extending therethrough facilitating air communication with the inside of said bucket body;
   said air compressing means including an elastic pouch fastened on top of said stopper member in said opening of bucket and provided with an exhause exit at its lower end in communication with said hole of stopper member;
   an L-shaped delivery tube rotatably mounted in the top of said bucket body with one end of said tube depending down into the inside of said bucket body to bottom or floor thereof and the other end of said tube including an outlet extending outside of said bucket body for rotation to and away from above the top of said bucket body; and
   a cap member shiftably mounted in the top of said body bucket and yieldable means urging said cap member against said outlet of delivery tube when said other end thereof is rotated to the closed position.

2. The bucket as claimed in claim 1, wherein the delivery tube is pivoted on the top of the bucket body by means of two fixed rings and may be turned arbitrarily.

3. An air compressed thermos bucket as claimed in claim 1, wherein the top of the bucket body where the delivery tube and the cap body are mounted, is formed to be a concave trough in slight triangular shape, and the drain pipe will be defined within the said triangular area for its anchorage and turning.

4. The bucket as claimed in claim 1 wherein the top of said bucket body is formed with a slotted hole portion and said cap member is shiftably disposed therein and includes a head portion tending to protrude slightly out of the top of said bucket body, said cap member also having an axle bar or stem portion extending downwardly from beneath said head portion, said slotted hole portion including a reduced diameter portion with said axle bar or stem portion extending therein to facilitate guided shifting of said cap member, and said yieldable means is in the form of a compression spring extending around said stem portion for compression between the underside of the head portion of said cap member and a shoulder above said reduced diameter portion of the slotted hole.

* * * * *